(12) United States Patent
Gunda et al.

(10) Patent No.: US 12,086,438 B2
(45) Date of Patent: Sep. 10, 2024

(54) MANAGEMENT OF THERMAL SHUTDOWN IN DATA STORAGE DEVICES

(71) Applicant: Western Digital Technologies, Inc., San Jose, CA (US)

(72) Inventors: Sridhar Prudviraj Gunda, Bangalore (IN); Jagadeesh Guptha Chavata, Andhra Pradesh (IN)

(73) Assignee: Sandisk Technologies, Inc., Milpitas, CA (US)

( * ) Notice: Subject to any disclaimer, the term of this patent is extended or adjusted under 35 U.S.C. 154(b) by 131 days.

(21) Appl. No.: 17/711,225

(22) Filed: Apr. 1, 2022

(65) Prior Publication Data
US 2023/0315313 A1 Oct. 5, 2023

(51) Int. Cl.
*G06F 3/06* (2006.01)
*G06F 1/20* (2006.01)

(52) U.S. Cl.
CPC .......... *G06F 3/0634* (2013.01); *G06F 1/206* (2013.01); *G06F 3/0616* (2013.01); *G06F 3/0653* (2013.01); *G06F 3/0679* (2013.01)

(58) Field of Classification Search
CPC .... G06F 3/0634; G06F 3/0625; G06F 3/0679; G06F 3/0619; G06F 3/0616; G06F 3/0653; G06F 1/206; G06F 11/3058; G06F 12/0246
See application file for complete search history.

(56) References Cited

U.S. PATENT DOCUMENTS

| | | | |
|---|---|---|---|
| 10,013,194 B1 | 7/2018 | Yang et al. | |
| 10,156,987 B1* | 12/2018 | Gutierrez | G06F 1/206 |
| 11,061,619 B1 | 7/2021 | Benisty et al. | |
| 2016/0065723 A1* | 3/2016 | Jung | G06F 3/0484 340/586 |
| 2018/0284857 A1 | 10/2018 | Yang et al. | |
| 2018/0349046 A1* | 12/2018 | Yang | G06F 1/3275 |
| 2022/0318603 A1* | 10/2022 | Kumar | G06F 12/0862 |

OTHER PUBLICATIONS

S. P. Kamat, "Thermal Management in Embedded Systems: A Software Approach," 2013, in IEEE Potentials, vol. 32, No. 1, pp. 23-26, Jan.-Feb. 2013, doi: 10.1109/MPOT.2012.2220036. (Year: 2013).*

* cited by examiner

*Primary Examiner* — Curtis James Kortman
(74) *Attorney, Agent, or Firm* — LOZA & LOZA, LLP; Gabriel Fitch

(57) ABSTRACT

Methods and apparatus for management of thermal shutdown in data storage devices are provided. One such data storage device includes a non-volatile memory (NVM) including a thermal shutdown temperature indicative of a maximum temperature at which the NVM will retain data stored therein; and a processor coupled to the NVM, the processor configured to: determine whether a temperature at the NVM exceeds the thermal shutdown temperature; start, responsive to the determination that the temperature at the NVM exceeds the thermal shutdown temperature, a timer; determine, responsive to the timer reaching a preselected duration, whether the temperature at the NVM still exceeds the thermal shutdown temperature; cause, responsive to the determination that the temperature at the NVM still exceeds the thermal shutdown temperature, the NVM to be powered off; and maintain power to components of the data storage device other than the NVM.

18 Claims, 7 Drawing Sheets

MANAGEMENT OF THERMAL SHUTDOWN IN DATA STORAGE DEVICES

FIELD

The subject matter described herein relates to data storage devices and controllers. More particularly, the subject matter relates, in some examples, to the management of thermal shutdown in data storage devices.

INTRODUCTION

Data storage devices, such as solid-state devices (SSDs), may generate a significant amount of heat during operation. In the case of SSDs, for example, a controller of an SSD may be instructed (e.g., by a host device) to execute a series of memory operations (e.g., read, write, etc.) with respect to one or more non-volatile memory devices (e.g., negative-AND (NAND) Flash memory devices). Rapid execution of these memory operations to meet the performance demands of the host may cause excess heat to build up in the SSD. Such excess heat may raise the temperature of the SSD to a critical temperature (e.g., a temperature at which the SSD shuts off to prevent damage to the components of the SSD), thereby negatively impacting SSD performance.

Thermal throttling allows SSD operation within a temperature constraint while attempting to maximizing performance. High performance consumes high power, which in turn dissipates heat that can cause the system to reach a thermal constraint of a certain temperature, where the SSD may be powered off. These high temperature events can occur quickly and thereby cause an unplanned or ungraceful shutdown of the SSD. Recovery from an ungraceful shutdown decreases SSD performance (e.g., for attending to host requests/commands) and increases mount time (e.g., as compared to a graceful shutdown or avoiding shutdown all together), which is the time during which the SSD is powering and initializing up but not yet functional. The recovery also may involve additional log writes (e.g., writing of SSD system information to the NVM) which may increase write amplification during log synchronization at mount time. Therefore, improved techniques for mitigating temperature increases and thermal shutdowns in SSDs are needed.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One aspect of the disclosure provides a data storage device, including: a non-volatile memory (NVM) including a thermal shutdown temperature indicative of a maximum temperature at which the NVM will retain data stored therein; and a processor coupled to the NVM, the processor configured to: determine whether a temperature at the NVM exceeds the thermal shutdown temperature; start, responsive to the determination that the temperature at the NVM exceeds the thermal shutdown temperature, a timer; determine, responsive to the timer reaching a preselected duration, whether the temperature at the NVM still exceeds the thermal shutdown temperature; cause, responsive to the determination that the temperature at the NVM still exceeds the thermal shutdown temperature, the NVM to be powered off; and maintain power to components of the data storage device other than the NVM.

Another aspect of the disclosure provides a method for use with a data storage device including a non-volatile memory (NVM) including a thermal shutdown temperature indicative of a maximum temperature at which the NVM will retain data stored therein, the method including: determining whether a temperature at the NVM exceeds the thermal shutdown temperature; starting, responsive to the determination that the temperature at the NVM exceeds the thermal shutdown temperature, a timer; determining, responsive to the timer reaching a preselected duration, whether the temperature at the NVM still exceeds the thermal shutdown temperature; causing, responsive to the determination that the temperature at the NVM still exceeds the thermal shutdown temperature, the NVM to be powered off; and maintaining power to components of the data storage device other than the NVM.

Another aspect of the disclosure provides a data storage device, including: a non-volatile memory (NVM) including a thermal shutdown temperature indicative of a maximum temperature at which the NVM will retain data stored therein; means for determining whether a temperature at the NVM exceeds the thermal shutdown temperature; means for starting, responsive to the determination that the temperature at the NVM exceeds the thermal shutdown temperature, a timer; means for determining, responsive to the timer reaching a preselected duration, whether the temperature at the NVM still exceeds the thermal shutdown temperature; means for causing, responsive to the determination that the temperature at the NVM still exceeds the thermal shutdown temperature, the NVM to be powered off; and means for maintaining power to components of the data storage device other than the NVM.

DETAILED DESCRIPTION

Figure 1:
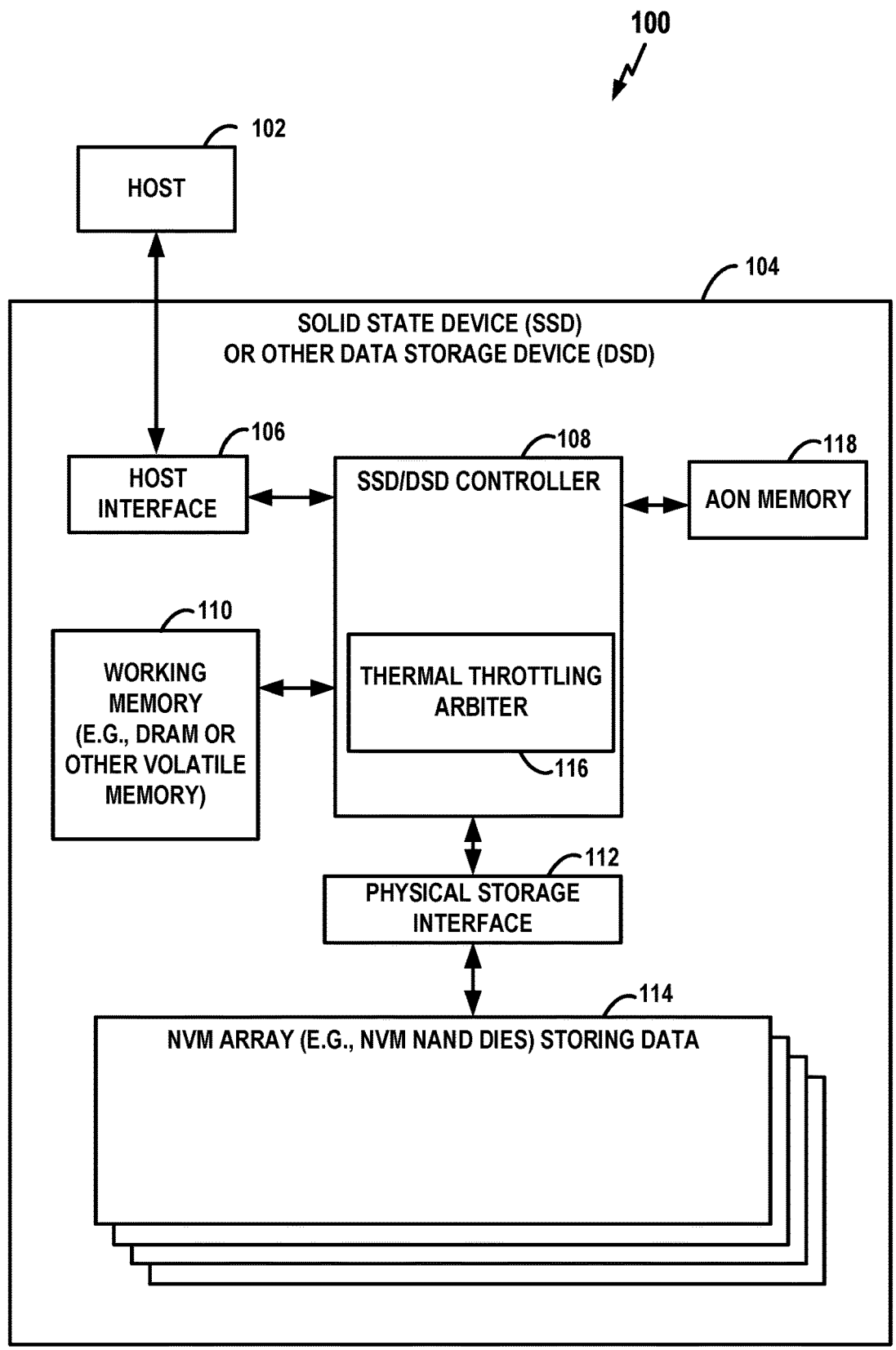
FIG. 1 is a schematic block diagram illustrating an exemplary data storage device (DSD) embodied as a solid-state device (SSD) including an SSD controller configured to manage thermal shutdown using a reduced power state in accordance with some aspects of the disclosure.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

The examples herein relate to data storage devices (DSDs) and to data storage controllers of the DSDs. In the main examples described herein, data is stored within non-volatile memory (NVM) arrays. In other examples, data may be stored in hard disk drives (HDD) using magnetic recording. DSDs with NVM arrays may be referred to as solid state devices (SSDs). Some SSDs use NAND flash memory, herein referred to as "NANDs." A NAND is a type of non-volatile storage technology that does not require power to retain data. It exploits negative-AND, i.e., NAND, logic. For the sake of brevity, an SSD having one or more NAND dies will be used as a non-limiting example of a DSD below in the description of various embodiments. It is understood that at least some aspects described herein may be applicable to other forms of DSDs as well. For example, at least some aspects described herein may be applicable to phase-change memory (PCM) arrays, magneto-resistive random access memory (MRAM) arrays, and resistive random access memory (ReRAM) arrays.

Overview

Aspects of the disclosure relate to improved techniques to manage thermal throttling, and in particular thermal shutdown. One particular aspect involves a data storage device such as an SSD that includes a non-volatile memory (NVM) having a thermal shutdown temperature indicative of a maximum temperature at which the NVM will retain data stored therein and a processor coupled to the NVM. In such case, the processor is configured to determine whether a temperature at the NVM exceeds the thermal shutdown temperature; start, responsive to the determination that the temperature at the NVM exceeds the thermal shutdown temperature, a timer; determine, responsive to the timer reaching a preselected duration, whether the temperature at the NVM still exceeds the thermal shutdown temperature; cause, responsive to the determination that the temperature at the NVM still exceeds the thermal shutdown temperature, the NVM to be powered off; and maintain power to components of the data storage device other than the NVM. In one aspect, the thermal shutdown temperature is specified by a manufacturer of the NVM (e.g., NAND memory). In one aspect, the processor is also configured to determine, after the NVM was powered off, that the temperature at the NVM no longer exceeds the thermal shutdown temperature; and cause, responsive to the determination that the temperature at the NVM no longer exceeds the thermal shutdown temperature, the NVM to be powered on.

Thus, in some aspects, this disclosure relates to powering off the NVM when the NVM temperature reaches the thermal shutdown temperature, and maintains the thermal shutdown temperature for preselected duration. The power to the remaining components of the SSD (except maybe one or two components in addition to the NVM) may be maintained. This is counter to other known approaches to SSD thermal management where the SSD usually powers down entirely at the thermal shutdown temperature to avoid any potential damage to the SSD.

Several advantages are provided by these improved techniques for thermal management. For example, by powering down only the NVM/NAND rather than the entire SSD, the number of ungraceful shutdowns is reduced, which increases the life of the SSD. In addition, these improved techniques can reduce the latency associated with additional log writes (e.g., writing of SSD system information to the NVM) which may increase write amplification during log synchronization at mount time for recovery from ungraceful shutdowns. In addition, these improved techniques can prevent data loss at internal SSD RAMs since only the NVM is being powered down. Other advantages include a reduction of write amplification and avoidance of computing and managing composite temperature by focusing on the temperature of the NVM/NAND and ignoring or giving less weight to the temperatures of other SSD components such as the controller/processor.

Exemplary Devices, Systems and Procedures

FIG. 1 is a schematic block diagram illustrating an exemplary data storage device (DSD) embodied as a solid-state device (SSD) including an SSD controller configured to manage thermal shutdown using a reduced power state in accordance with some aspects of the disclosure. The system 100 includes a host 102 and the SSD 104 (or other DSD, but for simplicity referred to as an SSD below) coupled to the host 102. The host 102 provides commands to the SSD 104 for transferring data between the host 102 and the SSD 104. For example, the host 102 may provide a write command to the SSD 104 for writing data to the SSD 104 or read command to the SSD 104 for reading data from the SSD 104. The host 102 may be any system or device having a need for data storage or retrieval and a compatible interface for communicating with the SSD 104. For example, the host 102 may be a computing device, a personal computer, a portable computer, a workstation, a server, a personal digital assistant, a digital camera, or a digital phone as merely a few examples.

The SSD 104 includes a host interface 106, an SSD or DSD controller 108, a working memory 110 (such as DRAM or other volatile memory), a physical storage (PS) interface 112 (e.g., flash interface module (FIM)), and an NVM array 114 having one or more dies storing data. The host interface 106 is coupled to the controller 108 and facilitates communication between the host 102 and the controller 108. The controller 108 is coupled to the working memory 110 as well as to the NVM array 114 via the PS interface 112. The host interface 106 may be any suitable communication interface, such as a Non-Volatile Memory express (NVMe) interface, a Universal Serial Bus (USB) interface, a Serial Peripheral (SP) interface, an Advanced Technology Attachment (ATA) or Serial Advanced Technology Attachment (SATA) interface, a Small Computer System Interface (SCSI), an IEEE 1394 (Firewire) interface, Secure Digital (SD), or the like. In some embodiments, the host 102 includes the SSD 104. In other embodiments, the SSD 104 is remote from the host 102 or is contained in a remote computing system communicatively coupled with the host 102. For example, the host 102 may communicate with the SSD 104 through a wireless communication link. The NVM array 114 may include multiple dies.

In some examples, the host 102 may be a laptop computer with an internal SSD and a user of the laptop may wish to playback video stored by the SSD. In another example, the host again may be a laptop computer, but the video is stored by a remote server.

Although, in the example illustrated in FIG. 1, SSD 104 includes a single channel between controller 108 and NVM array 114 via PS interface 112, the subject matter described herein is not limited to having a single memory channel. For example, in some NAND memory system architectures, two, four, eight or more NAND channels couple the controller and the NAND memory device, depending on controller capabilities. In any of the embodiments described herein, more than a single channel may be used between the controller and the memory die, even if a single channel is shown in the drawings. The controller 108 may be implemented in a single integrated circuit chip and may communicate with different layers of memory in the NVM 114 over one or more command channels.

The controller 108 controls operation of the SSD 104. In various aspects, the controller 108 receives commands from the host 102 through the host interface 106 and performs the commands to transfer data between the host 102 and the NVM array 114. Furthermore, the controller 108 may manage reading from and writing to working memory 110 for performing the various functions effected by the controller and to maintain and manage cached information stored in the working memory 110.

The controller 108 may include any type of processing device, such as a microprocessor, a microcontroller, an embedded controller, a logic circuit, software, firmware, or the like, for controlling operation of the SSD 104. In some aspects, some or all of the functions described herein as being performed by the controller 108 may instead be performed by another element of the SSD 104. For example, the SSD 104 may include a microprocessor, a microcontroller, an embedded controller, a logic circuit, software, firmware, application specific integrated circuit (ASIC), or any kind of processing device, for performing one or more of the functions described herein as being performed by the controller 108. According to other aspects, one or more of the functions described herein as being performed by the controller 108 are instead performed by the host 102. In still further aspects, some or all of the functions described herein as being performed by the controller 108 may instead be performed by another element such as a controller in a hybrid drive including both non-volatile memory elements and magnetic storage elements. The SSD controller 108 includes a thermal throttling arbiter 116, which can be configured to perform thermal shutdown management as will be described in further detail below. In one aspect, the thermal throttling arbiter 116 can store SSD status information in an AON memory 118 or other suitable memory such as the NVM array 114. In one aspect, the thermal throttling arbiter 116 is a module within the SSD controller 108 that is controlled by firmware. In one aspect, the thermal throttling arbiter/controller 116 may be a separate component from the SSD controller 108 and may be implemented using any combination of hardware, software, and firmware (e.g., like the implementation options described above for SSD controller 108) that can perform thermal shutdown management as will be described in further detail below. In one example, the thermal throttling arbiter 116 is implemented using a firmware algorithm or other set of instructions that can be performed on the SSD controller 108 to implement the thermal shutdown management functions described below.

The working memory 110 may be any suitable memory, computing device, or system capable of storing data. For example, working memory 110 may be ordinary RAM, DRAM, double data rate (DDR) RAM, static RAM (SRAM), synchronous dynamic RAM (SDRAM), a flash storage, an erasable programmable read-only-memory (EPROM), an electrically erasable programmable ROM (EEPROM), or the like. In various embodiments, the controller 108 uses the working memory 110, or a portion thereof, to store data during the transfer of data between the host 102 and the NVM array 114. For example, the working memory 110 or a portion of the volatile memory 110 may be used as a cache memory. The NVM array 114 receives data from the controller 108 via the PS interface 112 and stores the data. In some embodiments, working memory 110 may be replaced by a non-volatile memory such as MRAM, PCM, ReRAM, etc. to serve as a working memory for the overall device.

The NVM array 114 may be implemented using flash memory (e.g., NAND flash memory). In one aspect, the NVM array 114 may be implemented using any combination of NAND flash, PCM arrays, MRAM arrays, and/or ReRAM. The NVM may have a thermal shutdown temperature. As used herein, the "thermal shutdown temperature" is a maximum temperature at which the NVM will retain data stored therein, according to a manufacturer of the NVM.

The PS interface 112 provides an interface to the NVM array 114. For example, in the case where the NVM array 114 is implemented using NAND flash memory, the PS interface 112 may be a flash interface module. In one aspect, the PS interface 112 may be implemented as a component of the SSD controller 108.

In the example of FIG. 1, the controller 108 may include hardware, firmware, software, or any combinations thereof that provide the functionality for the thermal management arbiter 116.

Although FIG. 1 shows an exemplary SSD and an SSD is generally used as an illustrative example in the description throughout, the various disclosed embodiments are not necessarily limited to an SSD application/implementation. As an example, the disclosed NVM array and associated processing components can be implemented as part of a package that includes other processing circuitry and/or components. For example, a processor may include, or otherwise be coupled with, embedded NVM array and associated circuitry. The processor could, as one example, off-load certain operations to the NVM and associated circuitry and/or components. As another example, the SSD controller 108 may be a controller in another type of device and still be configured to perform or control thermal shutdown management and/or throttling, and perform some or all of the other functions described herein.

The AON memory 118 may be any suitable memory, computing device, or system capable of storing data with a connection to power that does not get switched off. For example, AON memory 118 may be ordinary RAM, DRAM, double data rate (DDR) RAM, static RAM (SRAM), synchronous dynamic RAM (SDRAM), a flash storage, an erasable programmable read-only-memory (EPROM), an electrically erasable programmable ROM (EEPROM), or the like with a continuous power supply. In one aspect, the AON memory 118 may be a RAM with a continuous power supply (e.g., a connection to power that cannot be switched off unless there is a total loss of power to the SSD, such as during a graceful or ungraceful shutdown). In some aspects, the AON memory 118 is an optional component. Thus, in at least some aspects, the SSD 104 does not include the AON memory 118.

Thermal Throttling

Figure 2:
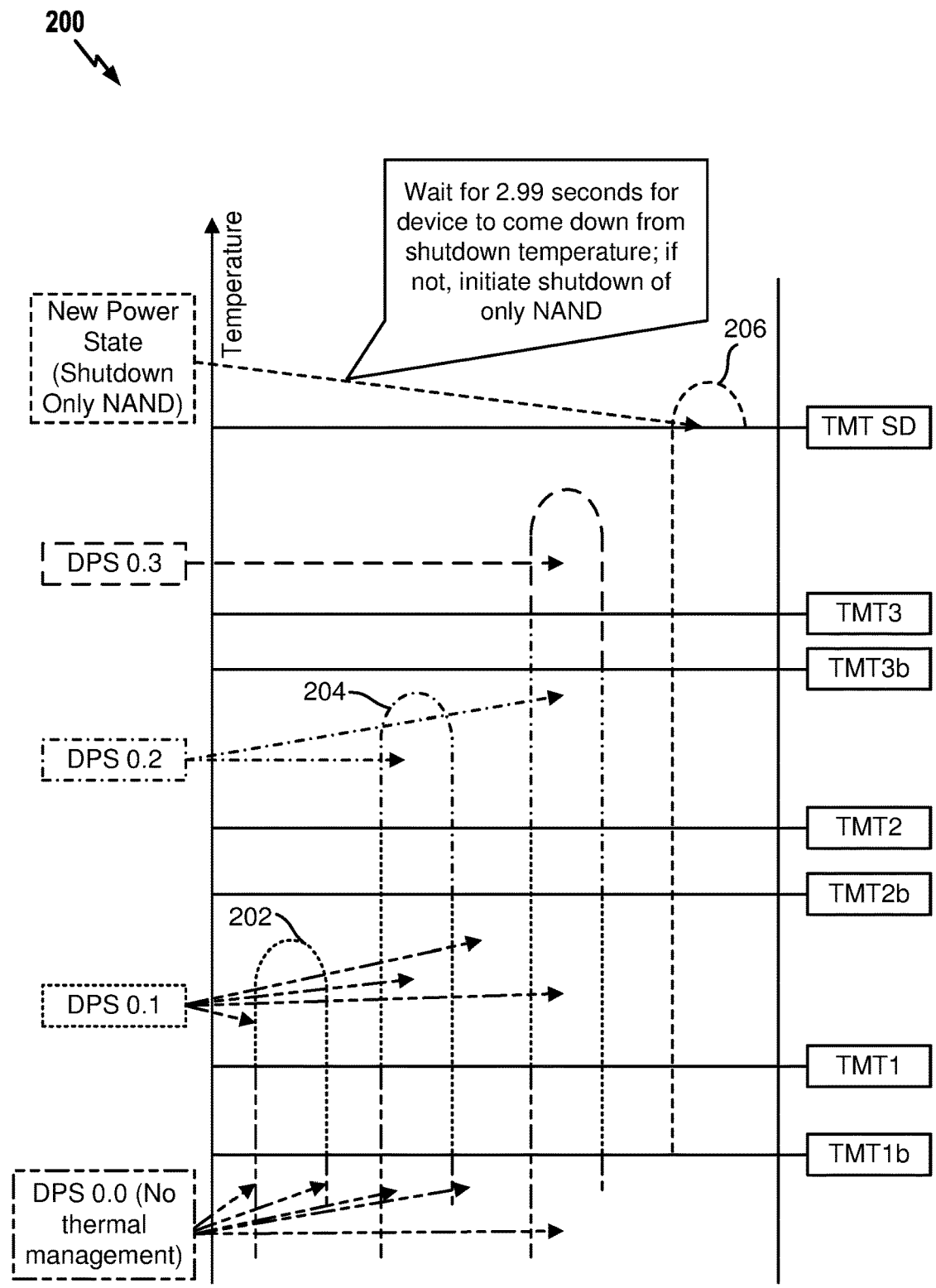
FIG. 2 is a schematic diagram illustrating one method for thermal shutdown management involving various temperature thresholds and corresponding SSD power states in accordance with some aspects of the disclosure.

FIG. 2 is a schematic diagram illustrating one method 200 for thermal shutdown management involving various temperature thresholds and corresponding SSD power states in accordance with some aspects of the disclosure. This method 200 could be used in conjunction with any of the SSDs described herein, including, for example, the SSD 104 of FIG. 1. The method 200 could also be used in conjunction with other data storage devices, including Secure Digital (SD) or Universal Serial Bus (USB) based data storage devices and/or flash based systems. Among other things, applications can include mobile, automotive, health or industrial devices.

The left side of the diagram of FIG. 2 shows a vertical axis indicating that temperature increases vertically. The diagram shows three possible thermal management sequences. While the method 200 as illustrated applies specifically to NAND memory, it could be applied to other types of non-volatile memory as well.

First, in thermal management sequence 202, the NAND temperature increases over a first temperature threshold (e.g., thermal management temperature 1 or TMT1), and the SSD/NAND subsystem may activate a light throttling and switch the device power state to a first throttled power state (e.g., device power state 0.1 or DPS0.1). This action is intended to cause the SSD and/or NAND cool down. When the temperature drops to a first temperature sub-threshold, TMT1b, the SSD/NAND subsystem may stop the light throttling and switch the device power state to a non-throttled power state, DPS0.0.

Second, in thermal management sequence 204, the NAND temperature increases above a second temperature threshold (e.g., thermal management temperature 2 or TMT2 and after increasing above TMT1), and the SSD/NAND subsystem may activate heavy throttling and switch the device power state to a second throttled power state (e.g., device power state 0.2 or DPS0.2). If the SSD/NAND can be cooled down, the SSD/NAND may switch back to DPS0.1 when reaching TMT2b and then to DPS0.0 when dropping below TMT1b.

Third, in thermal management sequence 206, if for some reason, the NAND temperature cannot be cooled down by throttling and it increases above a fourth temperature threshold (e.g., thermal management temperature shutdown or TMTSD after increasing above TMT3), the SSD/NAND subsystem may allow for a preselected time of 2.99 seconds for the device to come down below the shutdown temperature (TMTSD). If the NAND temperature still does not reduce below the shutdown temperature (TMTSD), the device/SSD may power off the NAND. If the NAND temperature reduces below the shutdown temperature (TMTSD), the SSD may power on the NAND.

In one example, the thermal management thresholds can be as follows: TMT1b=65° C.; TMT1=68° C.; TMT2b=75° C.; TMT2=78° C.; TMT3b=82° C.; TMT3=85° C.; TMTSD=93° C. In other examples, these thresholds can have other suitable values (e.g., dependent on drive or memory characteristics and application). In the above description of the thermal management sequences 202, 204, and 206, actions are taken based on increases in NAND temperature. In one aspect, these actions are taken solely based on increases or decreases in NAND temperature. In one aspect, this is because the temperature thresholds for failure are lowest at the NAND (e.g., 95° C.) as compared to other components in the SSD (e.g., 120° C.).

Figure 3:
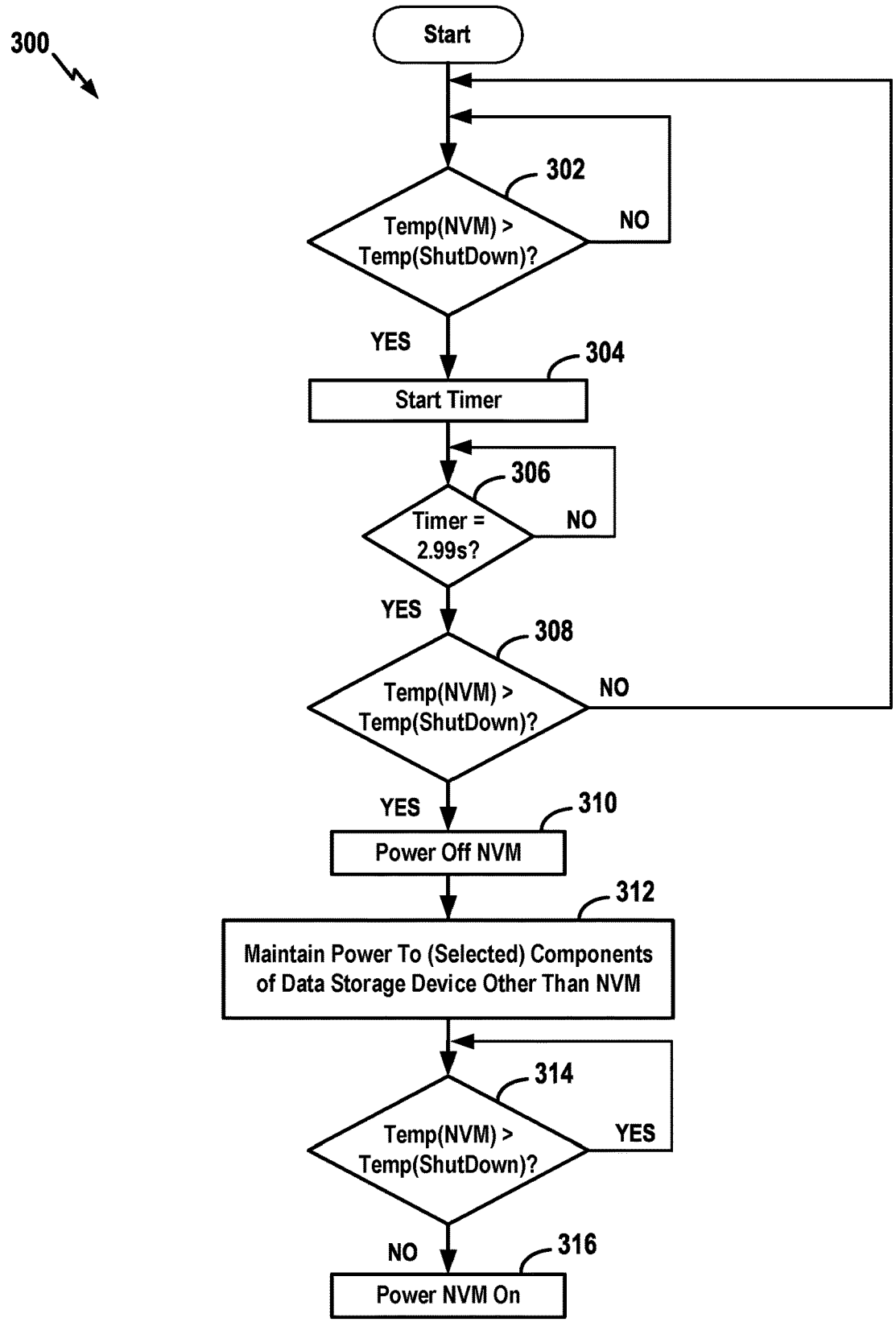
FIG. 3 is a flowchart illustrating a method for thermal shutdown management that may be performed by a controller of an SSD in accordance with some aspects of the disclosure.

FIG. 3 is a flowchart illustrating a method 300 for thermal shutdown management that may be performed by a controller of an SSD in accordance with some aspects of the disclosure. In one aspect, the method/process 300 may be performed by the SSD/DSD controller 108 (or thermal throttling arbiter 116) of FIG. 1, the NVMe controller 518 (or processor 524) of FIG. 5, the DSD controller 604 of FIG. 6, the DSD controller 700 of FIG. 7, or any other suitably equipped device controller. The NVM described for process 300 can be the working NVM of the SSD such as NVM arrays 114 of FIG. 1, NVM arrays 520 of FIG. 5, NVM 602 of FIG. 6, or NVM 701 of FIG. 7.

At block 302, the process determines whether a temperature (current temperature) at the NVM (Temp(NVM)) exceeds a thermal shutdown temperature of the NVM (Temp (ShutDown)), while the SSD is in a powered-on state. If not, the process keeps monitoring a temperature at the NVM and comparing it to the shutdown temperature in block 302. If so, the process proceeds to block 304.

In one aspect, the process can instead receive an indication of whether the condition of block 302 is met. This indication, or the reported temperature of the NVM, may be provided by a temperature sensor in the DSD or SSD. In one aspect, the temperature sensor is positioned at or near the NVM/NAND (e.g., at NVM 114 in FIG. 1 or at NVM 520 in FIG. 5). In one aspect, the temperature sensor measures an ambient temperature of the NVM, a workload temperature of the NVM, the temperature at specific NVM dies, an average temperature of all NVM dies, or some combination of these temperatures. In one aspect, the thermal shutdown temperature corresponds to a maximum allowed temperature (e.g., maximum temperature specified by the manufacturer of the NVM/NAND) before a data loss occurs in the NVM based on temperature. In one example, the maximum allowed temperature is 93° C. In another example, the maximum allowed temperature is 95° C. In one aspect, the process stores the NVM thermal shutdown temperature, receives, possibly periodically or instantaneously, indications of a temperature measured at the NVM, and makes comparisons to determine whether the NVM temperature exceeds the thermal shutdown temperature.

At block 304, the process starts a timer after determining that the NVM temperature exceeds the thermal shutdown temperature.

At block 306, the process determines whether the timer reached a preselected duration (e.g., 2.99 seconds as shown in FIG. 3). If so, the process proceeds to block 308. If not, the process keeps checking the timer value against the preselected duration. In one aspect, the process at block 306 also determines whether the NVM temperature has reduced below the thermal shutdown temperature, and if so, returns to block 302. In FIG. 3, the preselected duration is 2.99 seconds. However, the preselected duration can take other values depending on the application.

At block 308, the process determines whether the NVM temperature still exceeds the thermal shutdown temperature of the NVM at (or after) the preselected duration of 2.99 seconds. If not, the process returns to block 302 to monitor the NVM temperature. If so, the process proceeds to block 310.

At block 310, the process powers off the NVM (e.g., NAND memory). In one aspect, the process may also power off an additional component of the SSD in a further effort to reduce the temperature at the NVM. In one aspect, this additional component can be a power regulator configured to regulate power to the NVM, the flash interface module (FIM), and/or the FIM regulator. These SSD components will be discussed in greater detail below.

At block 312, the process maintains power to most, or all, of the other components of the SSD. In one aspect, for example, the process maintains power to all components of the SSD other than the NVM. In one aspect, the process maintains power to all components of the SSD other than the NVM and the NVM power regulator. In one aspect, the process maintains power to all components of the SSD other than one or more of the NVM, the NVM power regulator, the FIM, or the FIM regulator.

At block 314, the process determines whether the NVM temperature still exceeds the thermal shutdown temperature of the NVM. If so, the process keeps monitoring the NVM temperature and comparing it to the thermal shutdown temperature in block 314. If not, the process proceeds to block 316.

At block 316, the process powers the NVM back on. In one aspect, the process may also perform some initializations of the NVM needed for the process to begin accessing data stored thereon again.

In one aspect, the process may also perform additional actions often performed by an SSD controller. For example, the process may receive commands (e.g., read and write commands) from a host device, and execute the commands using the NVM. These commands can be stored and execution delayed while the NVM is powered off, or responsive to the NVM having been powered off.

Figure 4:
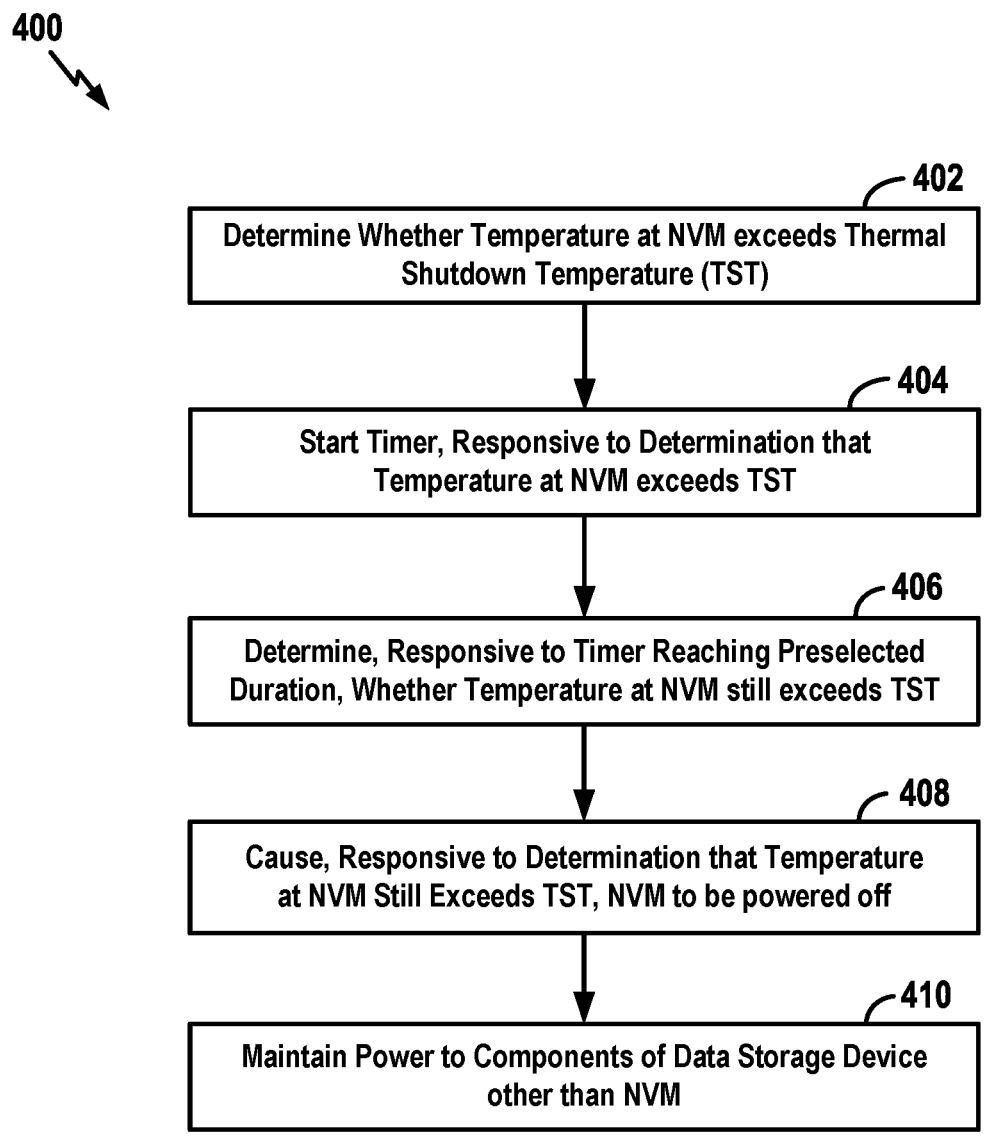
FIG. 4 is a flowchart illustrating a method for thermal shutdown management that may be performed by a controller of an SSD in accordance with some aspects of the disclosure.

FIG. 4 is a flowchart illustrating a method 400 for thermal shutdown management that may be performed by a controller of an SSD in accordance with some aspects of the disclosure. In one aspect, the method/process 400 may be performed by the SSD/DSD controller 108 (or thermal throttling arbiter 116) of FIG. 1, or the NVMe controller 518 (or processor 524) of FIG. 5, the DSD controller 604 of FIG. 6, the DSD controller 700 of FIG. 7, or any other suitably equipped device controller. The NVM described for process 400 can be the working NVM of the SSD such as NVM arrays 114 of FIG. 1, NVM arrays 520 of FIG. 5, NVM 602 of FIG. 6, or NVM 701 of FIG. 7.

At block 402, the process determines whether a temperature at the NVM exceeds the thermal shutdown temperature. If not, the process keeps checking the NVM temperature against the thermal shutdown temperature. If so, the process proceeds to block 404.

At block 404, the process starts, responsive to the determination that the temperature at the NVM exceeds the thermal shutdown temperature, a timer.

At block 406, the process determines, responsive to the timer reaching a preselected duration, whether the temperature at the NVM still exceeds the thermal shutdown temperature. If not, the process returns to block 402. If so, the process proceeds to block 408. In one aspect, the preselected duration is 2.99 seconds. In other aspects, it can have other suitable values, possibly depending on the characteristics of the SSD and/or NVM (e.g., NAND). In one aspect, the determination of block 406 is ongoing as soon as the timer starts. In such case, if at any time after the timer starts, the NVM temperature reduces below the thermal shutdown temperature, the process returns to block 402.

At block 408, the process causes, responsive to the determination that the temperature at the NVM still exceeds the thermal shutdown temperature (e.g., at or after the timer reaches the preselected duration), the NVM to be powered off. In one aspect, the process may also decide to power off one or more components of the SSD in addition to the NVM as is discussed above.

At block 410, the process maintains power to components of the data storage device other than the NVM. In one aspect, this is not an active step that the process performs and is merely noted to reinforce the concept that the process at block 408 only powers off certain components of the SSD, including at least the NVM.

In one aspect, the process also determines whether the NVM temperature still exceeds the thermal shutdown temperature of the NVM, after powering down the NVM at block 408. If so, the process keeps monitoring the NVM temperature and comparing it to the thermal shutdown temperature. If not, the process powers on the NVM, along with any additional SSD components that were also powered off.

Figure 5:
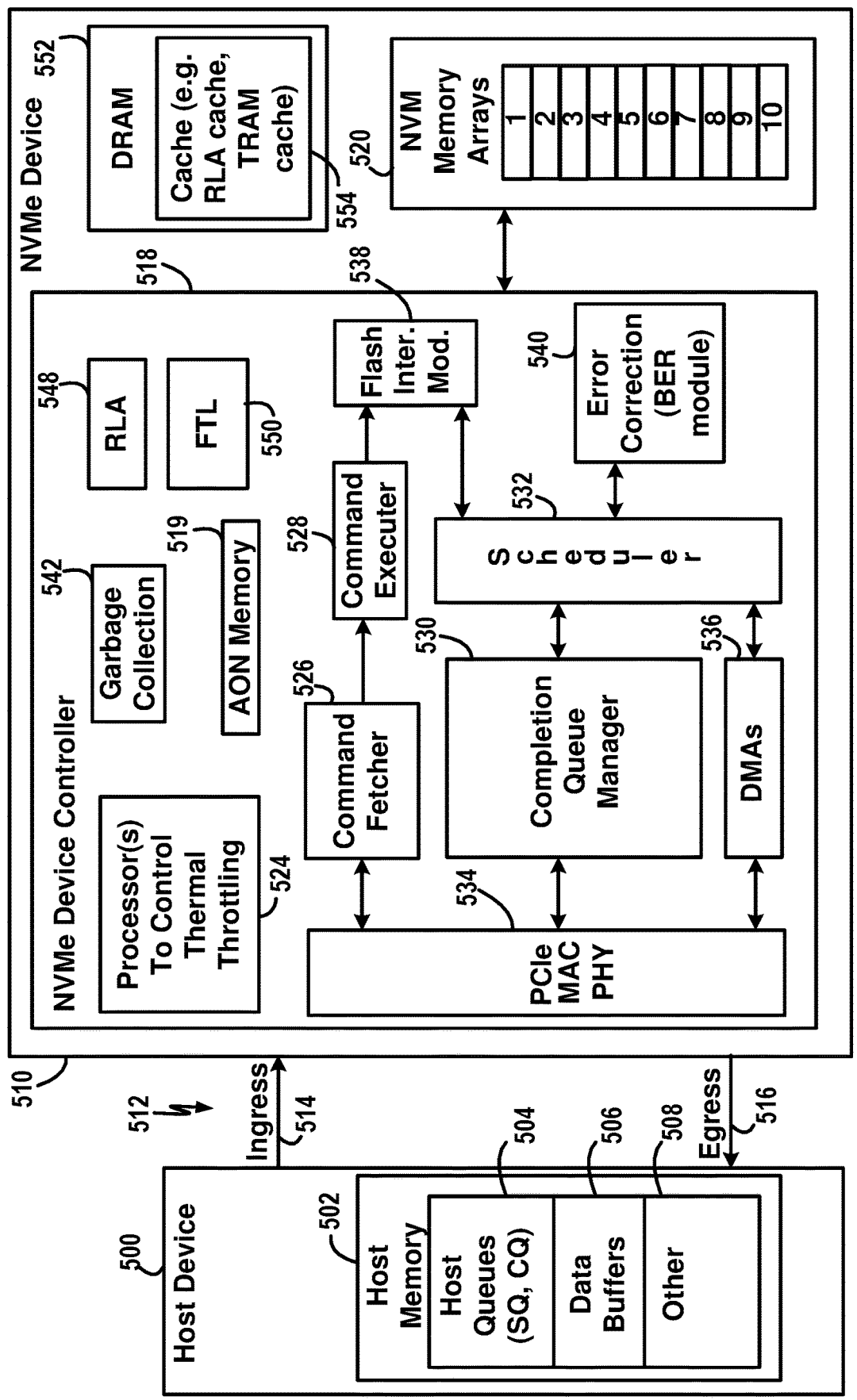
FIG. 5 is a schematic block diagram illustrating an exemplary data storage system with a Non-Volatile Memory express (NVMe) device controller configured to perform thermal shutdown management in accordance with some aspects of the disclosure.

FIG. 5 is a schematic block diagram illustrating an exemplary data storage system with a Non-Volatile Memory express (NVMe) device controller 518 configured to perform thermal shutdown management in accordance with some aspects of the disclosure. The system includes a host device 500 that may be any suitable computing or processing platform capable of accessing memory on an NVM data storage device to write or read data using NVMe procedures. The host device 500 includes internal memory 502, which in this example is dynamic random-access memory (DRAM). The host memory 502 may be configured to include, as shown, various host submission queues (SQs) and completion queues (CQs) 504, data buffers 506 and other memory components 508. The host device 500 may store data in an NVMe storage device 510. The NVMe device 510 may be any suitable device that provides non-volatile memory storage for host device 500 in accordance with NVMe standards. For example, the NVMe device 510 may be a removable storage device, such as a flash SSD that is removably connectable to host device 500. In another example, the NVMe device 510 may be non-removable or integrated within the host device 500. In some embodiments, the host device 500 and the NVMe device 510 are communicatively connected via a PCIe bus 512 (including ingress 514 and egress 516).

The NVMe storage device 510 of FIG. 5 includes an NVMe controller 518 and a non-volatile memory 520. The NVMe controller 518 controls access to the non-volatile memory (NVM) 520 such as a NAND or flash. The NVMe controller 518 thus may be a non-volatile memory controller that implements or supports the NVMe protocol, and the non-volatile memory 520 may implemented with two dimensional (2D) or three dimensional (3D) NAND flash memory. The NVMe controller includes one or more processors 524 configured to control thermal throttling, including thermal shutdown and recovery. The processor(s) 524 are also responsible for the execution of other frond-end and back-end tasks.

In operation, a command fetcher 526 of the NVMe controller 518 fetches commands, such as read requests for data, from the submission queues within the host memory 502 and forwards the commands to a command executer 528. The command fetcher 526 is responsible for fetching and parsing the commands from the host and queuing them internally, and may form part of a front end of the NVMe controller 518. The command executer 528 is responsible for arbitrating and executing the commands. Upon completion of the commands, the NVMe controller 518 generates completion entries that are ultimately directed to the completion queues within the host memory 502. A completion queue manager 530 is responsible for managing the host completion queues. Among other functions, the completion queue manager 530 routes completion entries received from a scheduler 532 to a completion queue within the host device 500 via a PCIe MAC PHY interface 534.

Actual streams of data (obtained as the result of read commands applied to the NVM memory arrays 520) are delivered to the host device 500 using one or more DMAs 536. Additional components of the NVMe controller 518 shown in FIG. 5 include a flash interface module (FIM) 538, which is responsible for controlling and accessing the memory arrays 520, and an error correction code (ECC) component 540, which includes a bit error rate (BER) module. The FIM 538 may include a FIM regulator (not shown) which controls power supplied to the FIM.

Additional components of the NVMe controller 518 include: a garbage collection module 542 for controlling garbage collection and related tasks; a read look ahead (RLA) controller 548; and an FTL 550. Note that some of these components may be part of the flash interface module 538 but are shown separately for the sake of completeness and convenience. The NVMe storage device 510 may additionally include a DRAM 552 (or other working memory), which may include a cache 554.

In one aspect, the thermal throttling processor 524 can perform one or more of the actions of process 300 in FIG. 3 or process 400 in FIG. 4, or act as the thermal throttling arbiter 116 of FIG. 1. For example, in one aspect, the thermal throttling processor 524 can determine whether the NVM temperature has reached or exceeded the thermal shutdown temperature of the NVM. If so, and it remains so after a preselected duration, the thermal throttling processor 524 can power off the NVM 520, including each of the NVM/NAND memory arrays 520. If the NVM temperature no longer exceeds the thermal shutdown temperature, the thermal throttling processor 524 can power on the NVM 520 and/or perform any initializations needed to return to accessing data stored in the NVM 520.

In one aspect, the thermal throttling processor 524 can be implemented as a single processor. In another aspect, the thermal throttling processor 524 can be implemented with a main processor and a secondary processor (e.g., a physical storage or PS processor). The main processor can be directed to performing the general functions of the controller 518, while the PS processor can be directed to performing the functions (e.g., reads and writes) related to communication with the memory arrays 520.

In one aspect, NAND memory arrays 520 can include a temperature sensor disposed to measure an ambient temperature at the NAND arrays 520, or at each of the NAND arrays. In one aspect, another temperature sensor can be disposed within the controller 518. In one aspect, one temperature sensor can be disposed at the NVM 520 and one can be disposed at, or within, the controller 518. In one aspect, the NVMe device 510 further includes an NVM power regulator (not shown) that is configured to control power supplied to the NVM (e.g., NAND memory arrays) 520.

In one aspect, the host 500 or the NVMe device 510 includes or acts as a resource server that allocates certain units of power for the device. The techniques described herein for reducing ungraceful shutdowns and saving power can help the device 510 comply with the power allocations set forth by the resource server.

The NVMe controller 518 also includes an optional always on (AON) memory 519 that can be used to store various information that is effectively persistent within the AON memory because the AON memory is configured to never lose power. In some aspects, the AON memory is omitted from the NVMe controller 518.

In the following, various general exemplary procedures and systems are described.

Additional Exemplary Apparatus

Figure 6:
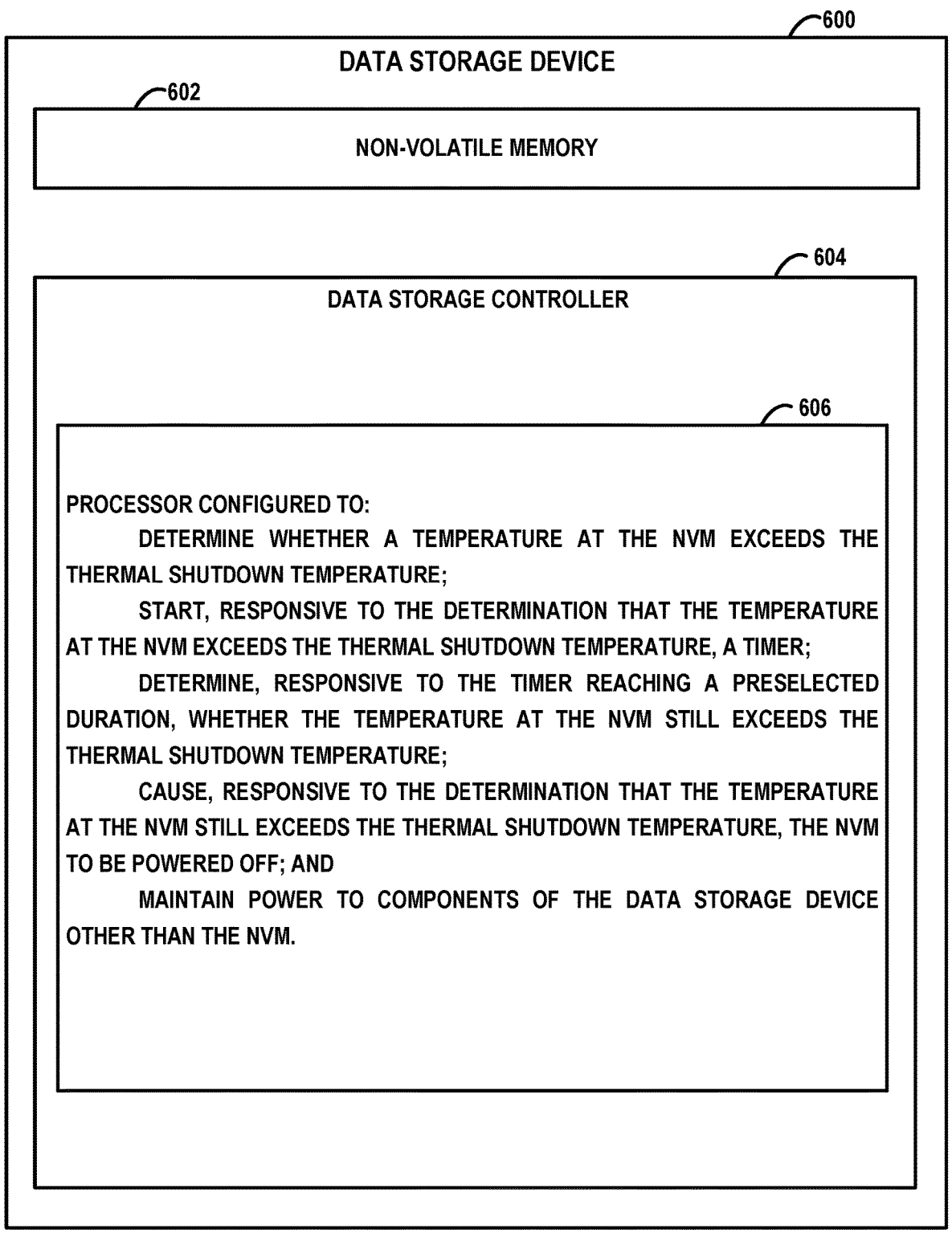
FIG. 6 is a schematic block diagram illustrating an exemplary data storage device configured to perform thermal shutdown management in accordance with some aspects of the disclosure.

FIG. 6 is a schematic block diagram illustrating an exemplary data storage device 600 configured to perform thermal shutdown management in accordance with some aspects of the disclosure. The data storage device 600 includes a non-volatile memory (NVM) 602 and a data storage controller 604. The data storage controller 604 includes a processor or processing circuit 606 configured to: determine whether a temperature at the NVM 602 exceeds the thermal shutdown temperature; start, responsive to the determination that the temperature at the NVM 602 exceeds the thermal shutdown temperature, a timer; determine, responsive to the timer reaching a preselected duration, whether the temperature at the NVM 602 still exceeds the thermal shutdown temperature; cause, responsive to the determination that the temperature at the NVM 602 still exceeds the thermal shutdown temperature, the NVM 602 to be powered off; and maintain power to components of the data storage device other than the NVM 602.

The processor 606 may also be configured to determine, after the NVM was powered off, that the temperature at the NVM no longer exceeds the thermal shutdown temperature' and cause, responsive to the determination that the temperature at the NVM no longer exceeds the thermal shutdown temperature, the NVM to be powered on.

The processor 606 may also be configured to determine, prior to expiry of the preselected duration, that the temperature at the NVM no longer exceeds the thermal shutdown temperature' and maintain, responsive to the determination that the temperature at the NVM no longer exceeds the thermal shutdown temperature, power to the NVM.

The processor 606 may also be configured to cause, responsive to the determination that the temperature at the NVM still exceeds the thermal shutdown temperature at or after the preselected duration, at least one component of the data storage device to be powered off in addition to the NVM. The at least one component can be an NVM power regulator, a FIM, or a FIM regulator.

The processor 606 may also be configured to store the thermal shutdown temperature' receive an indication of a temperature measured at the NVM' and determine whether the received temperature at the NVM exceeds the stored thermal shutdown temperature.

The processor 606 may also be configured to determine, prior to the determination of whether the temperature at the NVM exceeds the thermal shutdown temperature, that a temperature at the NVM exceeds a threshold temperature lower than the thermal shutdown temperature' and perform, responsive to the determination that the temperature at the NVM exceeds the threshold temperature, thermal throttling at the data storage device. For example, the processor 606 may be configured to perform any of the thermal throttling described above for FIG. 2.

The processor 606 may also be configured to receive commands from a host device, and execute the commands using the NVM.

Figure 7:
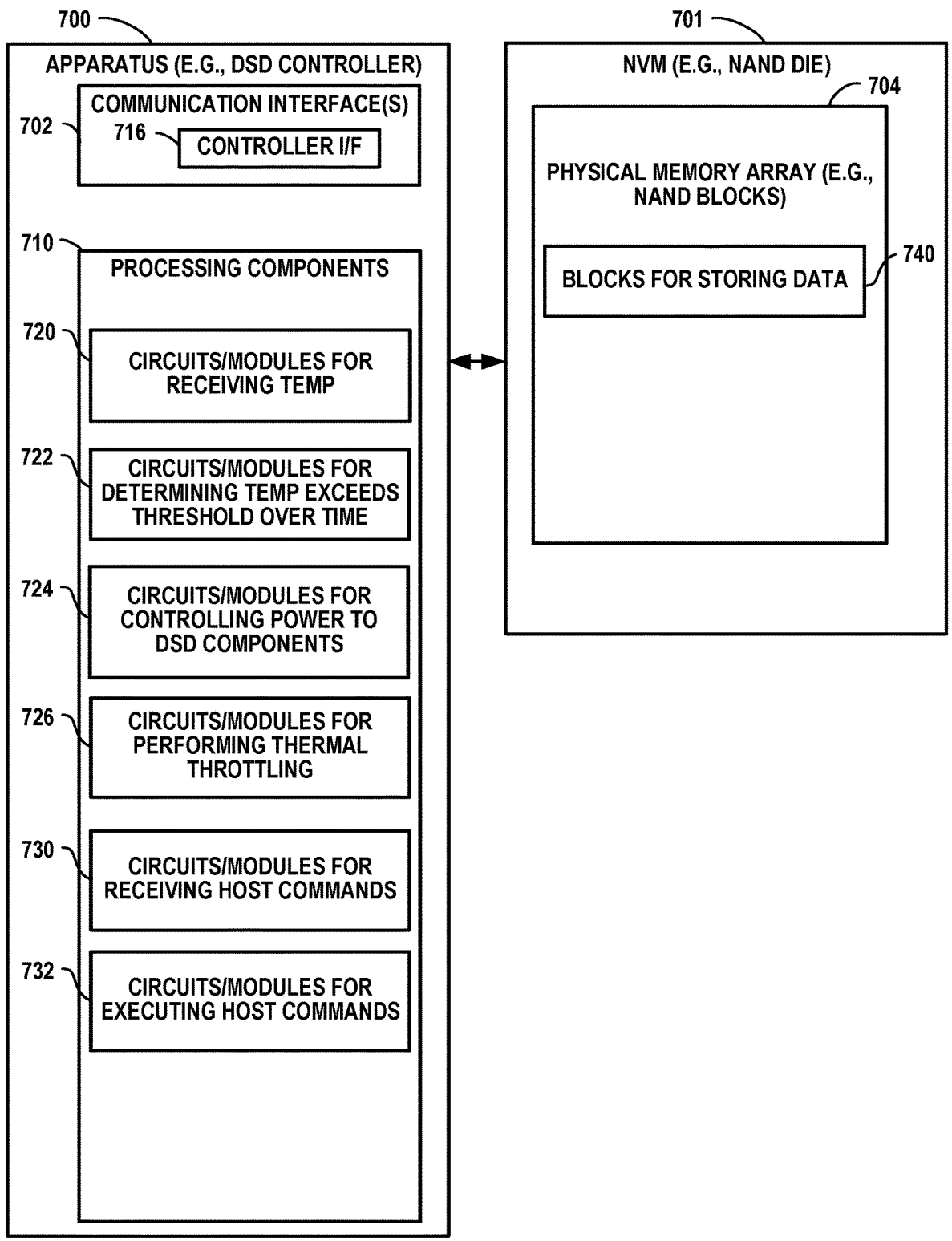
FIG. 7 is a schematic block diagram configuration for an exemplary data storage device configured to perform thermal shutdown management in accordance with some aspects of the disclosure.

FIG. 7 is a schematic block diagram configuration for an exemplary data storage device 700 configured to perform thermal shutdown management in accordance with some aspects of the disclosure. The apparatus 700, or components thereof, could embody or be implemented within a data storage controller such as a DSD controller coupled to a volatile memory (not shown) and a NAND die or some other type of NVM array that supports data storage. In various implementations, the apparatus 700, or components thereof, could be a component of a processor, a controller, a computing device, a personal computer, a portable device, workstation, a server, a personal digital assistant, a digital camera, a digital phone, an entertainment device, a medical device, a self-driving vehicle control device, an edge device, or any other electronic device that stores, processes, or uses data.

The apparatus 700 includes a communication interface 702 and is coupled to a NVM 701 (e.g., a NAND die). The NVM 701 includes physical memory array 704. These components can be coupled to and/or placed in electrical communication with one another via suitable components, represented generally by the connection line in FIG. 7. Although not shown, other circuits such as timing sources, peripherals, voltage regulators, and power management circuits may be provided, which will not be described any further. Additional components, such as those shown in FIG. 5, may also be included with apparatus 700.

The communication interface 702 of the apparatus 700 provides a means for communicating with other apparatuses over a transmission medium. In some implementations, the communication interface 702 includes circuitry and/or programming (e.g., a program) adapted to facilitate the communication of information bi-directionally with respect to one or more devices in a system. In some implementations, the communication interface 702 may be configured for wire-based communication. For example, the communication interface 702 could be a bus interface, a send/receive interface, or some other type of signal interface including circuitry for outputting and/or obtaining signals (e.g., outputting signal from and/or receiving signals into a DSD).

The physical memory array 704 may include one or more NAND blocks 740, or other suitable NVM blocks. The physical memory array 704 may be accessed by the processing components 710.

In one aspect, the apparatus 700 may also include volatile memory for storing instructions and other information to support the operation of the processing components 710.

The apparatus 700 includes various processing components 710 arranged or configured to obtain, process and/or send data, control data access and storage, issue or respond to commands, and control other desired operations. For example, the components 710 may be implemented as one or more processors, one or more controllers, and/or other structures configured to perform functions. According to one or more aspects of the disclosure, the components 710 may be adapted to perform any or all of the features, processes, functions, operations and/or routines described herein. For example, the components 710 may be configured to perform any of the steps, functions, and/or processes described with respect to FIGS. 1-6. As used herein, the term "adapted" in relation to components 710 may refer to the components being one or more of configured, employed, implemented, and/or programmed to perform a particular process, function, operation and/or routine according to various features described herein. The circuits may include a specialized processor, such as an ASIC that serves as a means for (e.g., structure for) carrying out any one of the operations described, e.g., in conjunction with FIGS. 1-6. The components 710 serve as an example of a means for processing. In various implementations, the components 710 may provide and/or incorporate, at least in part, functionality described above for the components of controller 108 of FIG. 1, controller 518 of FIG. 5, or controller 604 of FIG. 6.

According to at least one example of the apparatus 700, the processing components 710 may include one or more of: circuit/modules 720 configured for receiving temperature; circuits/modules 722 configured for determining whether temperature exceeds a threshold (over time); circuits/modules 724 configured for controlling power to one or more components of the DSD; circuits/modules 730 configured for receiving host commands; and circuits/modules 732 configured for executing host commands.

The physical memory array 704 may include blocks 740 for storing data.

In at least some examples, means may be provided for performing the functions illustrated in FIG. 6 and/or other functions illustrated or described herein. For example, the means may include one or more of: means, such as circuit/module 720 and/or circuit/module 722, for determining whether a temperature at the NVM exceeds the thermal shutdown temperature; means, such as circuit/module 722, for starting, responsive to the determination that the temperature at the NVM exceeds the thermal shutdown temperature, a timer; means, such as circuit/module 722, for determining, responsive to the timer reaching a preselected duration, whether the temperature at the NVM still exceeds the thermal shutdown temperature; means, such as circuit/module 724, for causing, responsive to the determination that the temperature at the NVM still exceeds the thermal shutdown temperature, the NVM to be powered off; and means, such as circuit/module 724, for maintaining power to components of the data storage device other than the NVM.

In at least some other examples, means may be provided for performing the functions illustrated in FIG. 6 and/or other functions illustrated or described herein. For example, the means may include one or more of: means, such as circuit/module 722, determining, after the NVM was powered off, that the temperature at the NVM no longer exceeds the thermal shutdown temperature; and means, such as circuit/module 724, for causing, responsive to the determination that the temperature at the NVM no longer exceeds the thermal shutdown temperature, the NVM to be powered on; means, such as circuit/module 722, for determining, prior to expiry of the preselected duration, that the temperature at the NVM no longer exceeds the thermal shutdown temperature; and means, such as circuit/module 724, for maintaining, responsive to the determination that the temperature at the NVM no longer exceeds the thermal shutdown temperature, power to the NVM; means, such as circuit/module 724, for causing, responsive to the determination that the temperature at the NVM still exceeds the thermal shutdown temperature at or after the preselected duration, at least one component of the data storage device to be powered off in addition to the NVM; means, such as circuit/module 720, for storing the thermal shutdown temperature; means, such as circuit/module 720, for receiving an indication of a temperature measured at the NVM; and means, such as circuit/module 722, for determining whether the received temperature at the NVM exceeds the stored thermal shutdown temperature; means, such as circuit/module 722, for determining, prior to the determination of whether the temperature at the NVM exceeds the thermal shutdown temperature, that a temperature at the NVM exceeds a threshold temperature lower than the thermal shutdown temperature; and means, such as circuit/module 726, for performing, responsive to the determination that the temperature at the NVM exceeds the threshold temperature, thermal throttling at the data storage device; means, such as circuit/module 730, for receiving commands from a host device; and means, such as circuit/module 730, executing commands using the NVM.

In the examples of FIGS. 1-7, NAND memory is sometimes set forth as an exemplary NVM. In one aspect, the NVM may be flash memory or another suitable NVM, examples of which are noted above at the beginning of the Detailed Description section.

Additional Aspects

At least some of the processing circuits described herein may be generally adapted for processing, including the execution of programming code stored on a storage medium. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

At least some of the processing circuits described herein may be arranged to obtain, process and/or send data, control data access and storage, issue commands, and control other desired operations. The processing circuits may include circuitry configured to implement desired programming provided by appropriate media in at least one example. For example, the processing circuits may be implemented as one or more processors, one or more controllers, and/or other structure configured to execute executable programming. Examples of processing circuits may include a general purpose processor, a digital signal processor (DSP), an ASIC, a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. At least some of the processing circuits may also be implemented as a combination of computing components, such as a combination of a controller and a microprocessor, a number of microprocessors, one or more microprocessors in conjunction with an ASIC and a microprocessor, or any other number of varying configurations. The various examples of processing circuits noted herein are for illustration and other suitable configurations within the scope of the disclosure are also contemplated.

Aspects of the subject matter described herein can be implemented in any suitable NVM, including NAND flash memory such as 3D NAND flash memory. More generally, semiconductor memory devices include working memory devices, such as DRAM or SRAM devices, NVM devices, ReRAM, EEPROM, flash memory (which can also be considered a subset of EEPROM), ferroelectric random access memory (FRAM), and MRAM, and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured. The semiconductor memory elements located within and/or over a substrate may be arranged in two or three dimensions, such as a two dimensional memory structure or a three-dimensional memory structure.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements. One of skill in the art will recognize that the subject matter described herein is not limited to the two-dimensional and three-dimensional exemplary structures described but cover all relevant memory structures within the spirit and scope of the subject matter as described herein and as understood by one of skill in the art.

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatus, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state, or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," "in one aspect," or similar language means that a particular feature, structure, or characteristic described in connection with the embodiment is included in at least one embodiment of the present disclosure. Thus, appearances of the phrases "in one embodiment," "in an embodiment," "in one aspect," and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of A, B, or C" or "A, B, C, or any combination thereof" or "one or more of A, B, or C" used in the description or the claims means "A or B or C or any combination of these elements." For example, this terminology may include A, or B, or C, or A and B, or A and C, or A and B and C, or 2A, or 2B, or 2C, or 2A and B, and so on. As a further example, "at least one of: A, B, or C" or "one or more of A, B, or C" is intended to cover A, B, C, A-B, A-C, B-C, and A-B-C, as well as multiples of the same members (e.g., any lists that include AA, BB, or CC). Likewise, "at least one of: A, B, and C" or "one or more of A, B, or C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A data storage device, comprising:
   a non-volatile memory (NVM) comprising flash memory and a thermal shutdown temperature indicative of a maximum temperature at which the NVM will retain data stored therein; and
   one or more processors coupled to the NVM, the one or more processors, individually or in combination, configured to:
   determine whether a temperature at the NVM exceeds the thermal shutdown temperature, wherein the temperature at the NVM is measured at the flash memory;
   start, responsive to a determination that the temperature at the NVM exceeds the thermal shutdown temperature, a timer;
   determine, responsive to the timer reaching a preselected duration, whether the temperature at the NVM still exceeds the thermal shutdown temperature;
   cause, responsive to a determination that the temperature at the NVM still exceeds the thermal shutdown temperature, the NVM and at least one additional component of the data storage device to be powered off, wherein the at least one additional component of the data storage device to be powered off comprises a power regulator configured to regulate power to the NVM and a flash interface module that is configured to control and access the NVM; and
   maintain power to at least one component of the data storage device other than the NVM, the power regulator, and the flash interface module.

2. The data storage device of claim 1, wherein the one or more processors is further configured, individually or in combination, to:
   determine, after the NVM was powered off, that the temperature at the NVM no longer exceeds the thermal shutdown temperature; and
   cause, responsive to the determination that the temperature at the NVM no longer exceeds the thermal shutdown temperature, the NVM to be powered on.

3. The data storage device of claim 1, wherein the preselected duration is 2.99 seconds.

4. The data storage device of claim 1, wherein the one or more processors is further configured, individually or in combination, to:
   determine, prior to expiry of the preselected duration, that the temperature at the NVM no longer exceeds the thermal shutdown temperature; and
   maintain, responsive to the determination that the temperature at the NVM no longer exceeds the thermal shutdown temperature, power to the NVM.

5. The data storage device of claim 1, wherein the at least one component of the data storage device other than the NVM, the power regulator, and the flash interface module consists of all components of the data storage device other than the NVM, the power regulator, and the flash interface module.

6. The data storage device of claim 1, wherein the one or more processors is configured, individually or in combination, to determine whether the temperature at the NVM exceeds the thermal shutdown temperature by being further configured to:
   store the thermal shutdown temperature;
   receive an indication of the temperature measured at the NVM; and
   determine whether the temperature at the NVM exceeds the thermal shutdown temperature.

7. The data storage device of claim 1, wherein the one or more processors is further configured, individually or in combination, to:
   determine, prior to the determination of whether the temperature at the NVM exceeds the thermal shutdown temperature, that a temperature at the NVM exceeds a threshold temperature lower than the thermal shutdown temperature; and
   perform, responsive to the determination that the temperature at the NVM exceeds the threshold temperature, thermal throttling at the data storage device.

8. The data storage device of claim 1, wherein the at least one additional component of the data storage device to be powered off further includes a flash interface module regulator that is configured to control power supplied to the flash interface module.

9. The data storage device of claim 1, wherein the one or more processors is further configured, individually or in combination, to:
   determine whether the temperature at the NVM exceeds a thermal management temperature but does not exceed the thermal shutdown temperature; and
   activate throttling at the data storage device and switch a device power state of the data storage device to a throttled power state, responsive to a determination that the temperature at the NVM exceeds the thermal management temperature but does not exceed the thermal shutdown temperature.

10. A method for use with a data storage device including a non-volatile memory (NVM) comprising flash memory and a thermal shutdown temperature indicative of a maximum temperature at which the NVM will retain data stored therein, the method comprising:
    determining whether a temperature at the NVM exceeds the thermal shutdown temperature, wherein the temperature at the NVM is measured at the flash memory;
    starting, responsive to a determination that the temperature at the NVM exceeds the thermal shutdown temperature, a timer;
    determining, responsive to the timer reaching a preselected duration, whether the temperature at the NVM still exceeds the thermal shutdown temperature;
    causing, responsive to a determination that the temperature at the NVM still exceeds the thermal shutdown temperature, the NVM and at least one additional component of the data storage device to be powered off, wherein the at least one additional component of the data storage device to be powered off comprises a power regulator configured to regulate power to the NVM and a flash interface module that is configured to control and access the NVM; and maintaining power to at least one component of the data storage device other than the NVM, the power regulator, and the flash interface module.

11. The method of claim 10, further comprising:
determining, after the NVM was powered off, that the temperature at the NVM no longer exceeds the thermal shutdown temperature; and
causing, responsive to the determination that the temperature at the NVM no longer exceeds the thermal shutdown temperature, the NVM to be powered on.

12. The method of claim 10, wherein the preselected duration is 2.99 seconds.

13. The method of claim 10, further comprising:
determining, prior to expiry of the preselected duration, that the temperature at the NVM no longer exceeds the thermal shutdown temperature; and
maintaining, responsive to the determination that the temperature at the NVM no longer exceeds the thermal shutdown temperature, power to the NVM.

14. The method of claim 10, wherein the at least one component of the data storage device other than the NVM, the power regulator, and the flash interface module consists of all components of the data storage device other than the NVM, the power regulator, and the flash interface module.

15. The method of claim 10, wherein the determining whether a temperature at the NVM exceeds the thermal shutdown temperature comprises:
storing the thermal shutdown temperature;
receiving an indication of the temperature measured at the NVM; and
determining whether the temperature at the NVM exceeds the thermal shutdown temperature.

16. The method of claim 10, wherein the at least one additional component of the data storage device to be powered off further includes a flash interface module regulator that is configured to control power supplied to the flash interface module.

17. The method of claim 10, further comprising:
determining whether the temperature at the NVM exceeds a thermal management temperature but does not exceed the thermal shutdown temperature; and
activating throttling at the data storage device and switching a device power state of the data storage device to a throttled power state, responsive to a determination that the temperature at the NVM exceeds the thermal management temperature but does not exceed the thermal shutdown temperature.

18. A data storage device, comprising:
a non-volatile memory (NVM) comprising flash memory and a thermal shutdown temperature indicative of a maximum temperature at which the NVM will retain data stored therein;
means for determining whether a temperature at the NVM exceeds the thermal shutdown temperature, wherein the temperature at the NVM is measured at the flash memory;
means for starting, responsive to a determination that the temperature at the NVM exceeds the thermal shutdown temperature, a timer;
means for determining, responsive to the timer reaching a preselected duration, whether the temperature at the NVM still exceeds the thermal shutdown temperature;
means for causing, responsive to a determination that the temperature at the NVM still exceeds the thermal shutdown temperature, the NVM and at least one additional component of the data storage device to be powered off, wherein the at least one additional component of the data storage device to be powered off comprises a power regulator configured to regulate power to the NVM and a flash interface module that is configured to control and access the NVM; and
means for maintaining power to at least one component of the data storage device other than the NVM, the power regulator, and the flash interface module.

* * * * *